Figure 1:
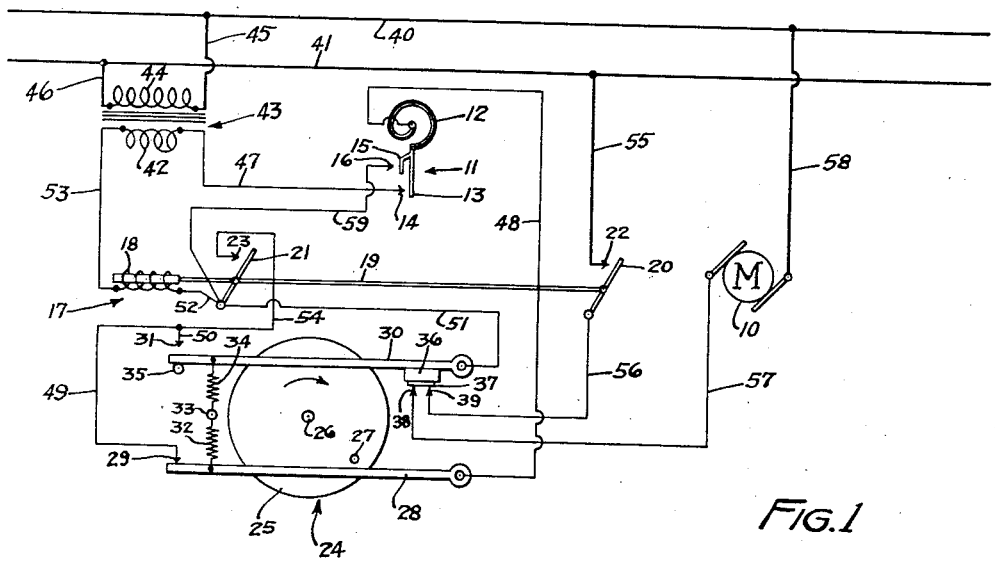

June 25, 1940.  W. M. SCHWEICKART  2,205,603
CONTROL SYSTEM
Filed Oct. 13, 1933  2 Sheets-Sheet 1

Inventor
WILLIAM M. SCHWEICKART
By Paul, Paul Ulgoung
ATTORNEYS

June 25, 1940.   W. M. SCHWEICKART   2,205,603
CONTROL SYSTEM
Filed Oct. 13, 1933   2 Sheets-Sheet 2

Inventor
WILLIAM M. SCHWEICKART
By Paul, Paul & Moore
Attorney

Patented June 25, 1940

2,205,603

UNITED STATES PATENT OFFICE 2,205,603

CONTROL SYSTEM

William M. Schweickart, Ramsey, N. J., assignor to Minneapolis-Honeywell Regulator Company, Minneapolis, Minn., a corporation of Delaware Application October 13, 1933, Serial No. 693,448

25 Claims. (Cl. 236—46)

My invention relates to control systems of general utility in controlling a force or the value of a condition and especially relates to electrical systems for controlling the temperature of buildings or houses employing thermostats as the main controlling devices. My invention is particularly intended and peculiarly adapted for use with those heating systems wherein the temperature is controlled by intermittently supplying heat as the temperature of the space to be heated rises above and falls below the temperature which it is desired to maintain in the space as distinguished from those systems in which heat is supplied substantially continuously at rates which are varied in accordance with the rise and fall of the temperature of the space above and below the desired value.

The primary object of my invention is to maintain a force or the value of a condition at more nearly a desired point than has heretofore been possible by prior control systems.

In temperature control systems and particularly in heating systems wherein, on a call for heat, additional heat must be generated in the heating device and then transmitted to the space to be heated, there is practically always a delay or lag between a call for heat by the space temperature responsive thermostat and the supplying of heat to the space with the result that the space temperature has fallen considerably below the desired value before the necessary heat has been generated and transmitted to the space. Similarly, when the space temperature has been restored and the thermostat calls for a shut-down of the heating system, usually some heat remains in the heating means which has not as yet been dissipated to the space and the dissipation of this remaining heat quite generally results in raising the space temperature above the desired value. Another of the broader objects of my invention therefore is the provision of a temperature control system which reduces the detrimental effects produced by lag in the temperature control system.

One of the manners in which I obtain the above mentioned closer control is by operating a device for maintaining a force or the value of a condition at the desired point at various rates, depending upon the value of the force or condition, and obtaining at least one of these rates of operation of the force or condition changing device by operating said device periodically or intermittently at a predetermined frequency. For example, if it be desired to supply heat at one half the capacity of the heating plant, I contemplate operating the heat supply controlling device at regular intervals so that the device operates to supply maximum heat for short periods and then operates to supply minimum heat for short periods of substantially equal duration whereby an intermediate amount of heat will be supplied over an average length of time.

A more specified object of the invention is the provision of a control system in which the temperature or other condition changing device is intermittently operated at one frequency when the temperature or other condition is at substantially the desired value, is not operated any of the time when the temperature or other condition deviates from the desired value a predetermined amount in one direction and is operated continuously when the temperature or other condition deviates from the desired value a predetermined amount in the other direction.

In a modified form of the invention, I contemplate supplying a small amount of heat even when the temperature of the space is above the desired temperature so that a small amount of heat will constantly be furnished to the space to offset the heat losses therefrom. Preferably, this small amount of heat is supplied by intermittently supplying heat at full capacity for relatively short periods whereas the periods between the supplying of heat or of supplying minimum heat are relatively long.

A further object of the invention is the provision of a control system having a main control responsive to a condition to be controlled and which main control operates a condition changing means continuously when the value of the condition is at one predetermined point and renders the condition changing means entirely inoperative to change the value of the condition when the value thereof is at another predetermined point spaced from the first mentioned point, the desired value of the condition lying between said points, together with means for operating the condition changing device intermittently when the value of the condition lies between said two points. The means for intermittently operating the condition changing device preferably takes the form of a timing mechanism which cooperates with the main control in such a manner as to bring about the above set-forth sequence of operations.

Another object of the invention is the provision of a temperature control system including a main control switch of the type that closes a first circuit when the temperature of the space to be heated falls to a predetermined degree and closes a second circuit when the temperature of the space falls to a predetermined lower degree (usually 2° or 3° lower), the desired temperature lying between said two points, and so arranging the system that the heating device is operated continuously to supply heat when both circuits are closed, is operated intermittently to supply an intermediate amount of heat when only one of said circuits is closed and is operated to supply minimum or no heat when both of said circuits are open.

Other objects of my invention include the various combinations and sub-combinations of elements and the specific electrical connections therebetween.

Other objects of the invention will become apparent as the description thereof proceeds.

Figure 2:
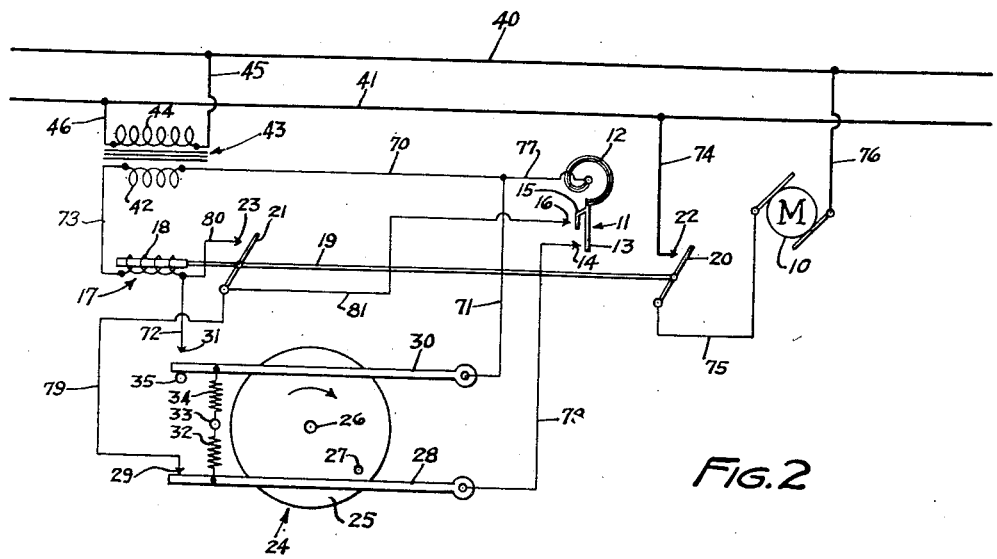
Figure 3:
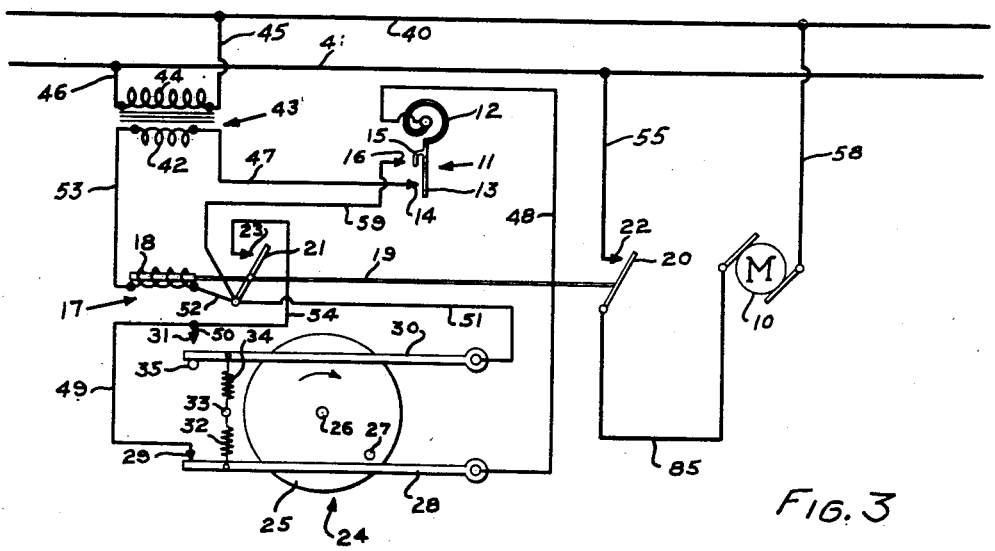

For a more complete understanding of the invention reference may be had to the following descriptions and accompanying drawings, in which:

Fig. 1 is a schematic showing of a heating system operated in accordance with the preferred form of my invention, Fig. 2 illustrates a heating system controlled by a modified form of my invention, and Fig. 3 shows a minor variation of the system of Fig. 1 by omitting the supplemental motor switch.

Referring first to Fig. 1, a motor indicated at 10 is herein used to represent any type of device for changing the force or condition and will be herein described as the well-known stoker motor which, when energized, supplies fuel and air to a furnace for heating purposes. A main control generally indicated at 11 is herein shown as a room thermostat comprising the usual bimetallic volute 12, a flexible contact blade 13 adapted to engage a stationary contact 14 and a second flexible contact blade 15 adapted to engage a stationary contact 16. This type of room thermostat is now well known and as is usual in thermostats of this construction blade 13 engages contact 14 when the temperature to which bimetallic volute 12 responds falls to a predetermined degree and blade 15 thereafter engages contact 16 if said temperature falls to a lower point (generally 2° or 3° lower than said first mentioned point). The room thermostat 11 controls the stoker motor 10 through a relay of usual construction indicated at 17 and which comprises a relay coil 18, armature 19, switch arms 20 and 21 and contacts 22 and 23. Upon energization of relay coil 18, armature 19 is attracted and moves switch arms 20 and 21 into engagement with contacts 22 and 23 respectively. Upon deenergization of relay coil 18, armature 19 is released for movement to the position shown in Fig. 1 wherein switch arms 20 and 21 are disengaged from contacts 22 and 23.

The system of Fig. 1 further includes a timing mechanism generally indicated at 24. The timing mechanism 24 is diagrammatically shown as comprising a timing disc 25 secured to a shaft 26 which may be continuously driven by any suitable means and at a speed, for example, of one revolution every ten minutes. The timing disc 25 carries a crank pin 27 which, during rotation of timing disc 25, engages a lever 28 to move the same out of engagement with a contact 29 and thereafter engages a similar lever 30 to lift the same into engagement with a contact 31. The contact 29 may operate as a stop for preventing excess movement of lever 28 under the bias of a coil spring 32 one end of which is secured to lever 28 and the other end of which is secured to a post 33. Lever 30 is biased downwardly out of engagement with contact 31 by means of a similar coil spring 34 which has one of its ends secured to lever 30 and its other end secured to post 33. A stop 35 prevents excessive movement of lever 30 under the influence of its biasing spring 34. Lever 30 carries a block of insulating material 36 to which is secured a contact plate 37 that bridges contacts 38 and 39 when lever 30 abuts stop 35. The contact plate 37 and contacts 38 and 39 comprise a supplemental switch for stoker motor 10 that may, under certain conditions, be omitted if desired.

High voltage electrical power is supplied by line wires 40 and 41 and low voltage power is supplied by the low voltage secondary 42 of a step-down transformer 43 having a high voltage primary 44 which is connected to line wires 40 and 41 by wires 45 and 46. For the purpose of this explanation, it will be assumed that timing disc 25 rotates in a clockwise direction.

With the parts in the position shown the room temperature is above the desired value, relay coil 18 is deenergized, and stoker motor 10 is deenergized whereby minimum or no fuel and air is being supplied to the heater. Lever 28 is engaging contact 29 and lever 30 is out of engagement with contact 31. Now if the room temperature falls to such a point that blade 13 engages contact 14, relay coil 18 will be energized the next time crank pin 27 lifts lever 30 into engagement with contact 31. This circuit is as follows: secondary 42, wire 47, contact 14, contact blade 13, bimetallic volute 12, wire 48, lever 28, contact 29, wire 49, wire 50, contact 31, lever 30, wire 51, wire 52, relay coil 18 and wire 53 to the other side of secondary 42. The resulting engagement of switch arm 21 with contact 23 establishes a holding circuit for relay coil 18 which is independent of the switch comprised by lever 30 and contact 31 and this holding circuit is as follows: secondary 42, wire 47, contact 14, contact blade 13, bimetallic volute 12, wire 48, lever 28, contact 29, wire 49, wire 54, contact 23, switch arm 21, wire 52, relay coil 18 and wire 53 to secondary 42. As the timing disc 25 continues to rotate, crank pin 27 will allow lever 30 to be returned to the position shown in the drawings wherein contact blade 38 bridges contacts 38 and 39. Stoker motor 10 is then energized by a circuit as follows: line 41, wire 55, contact 22, switch arm 20, wire 56, contact 39, contact plate 37, contact 38, wire 57, stoker motor 10 and wire 58 to line 40. As hereinbefore stated, the supplemental motor switch comprised by contact plate 37 and contacts 38 and 39 may be omitted if desired and in such event stoker motor 10 will be energized immediately upon engagement of switch arm 20 with contact 22.

Relay coil 18 remains energized until crank pin 27 rotates sufficiently to engage lever 28 and move it downwardly out of engagement with contact 29 whereupon the previously described holding circuit for relay coil 18 is broken. This deenergization of relay coil 18 allows switch arms 20 and 21 to disengage contacts 22 and 23 whereby the circuit to stoker motor 10 is interrupted and the holding circuit for relay coil 18 is additionally interrupted at 21—23 so that relay coil 18 cannot again be energized until all three switches 28—29, 30—31, and 13—14 are simultaneously closed. In this manner, with the temperature about at or slightly above the desired point as indicated by engagement only of blade 13 with contact 14, the stoker motor 10 is operated intermittently, the on-periods being substantially equal to the off-periods.

If the temperature of the room continues to fall and becomes less than that desired so that blade 15 engages contact 16, then in that event, an energizing circuit for relay coil 18 independent of both the timer operated switches is established as follows: secondary 42, wire 47, contact 14, contact blade 13, contact blade 15, contact 16, wire 59, wire 52, relay coil 18, and wire 53 to the other side of secondary 42. This results in energization of stoker motor 10 and it will be noted that the stoker motor 10 will operate continuously (except for momentary interruptions by the supplemental motor switch if used) as long as contact blade 15 engages contact 16.

The system of Fig. 1, therefore, provides a multiple stage control in which no heat or minimum heat is supplied when the temperature of the space to be heated is above a first point, an intermediate amount of heat is supplied (by intermittent operation of the stoker motor 10) when the temperature falls to said first point to cause contact blade 13 to engage contact 14 and maximum heat is supplied by continuous energization of stoker motor 10 when the temperature falls to a second point indicated by contact blade 15 engaging contact 16. Looking at the operation of Fig. 1 in a different way, this system distinguishes over prior art systems in that the stoker motor 10 is operated intermittently to supply an intermediate amount of heat when the temperature is substantially at the desired point, or between the maximum and minimum permissible limits as indicated by contact blade 13 being engaged with contact 14 and by contact blade 15 being disengaged from contact 16. Likewise, the system of Fig. 1 provides a multiple stage control wherein at least one of the stages of operation is obtained by intermittently operating the heat supply means at a minimum rate and then at a maximum rate.

Turning now to the system of Fig. 2, it will be noted that the various elements and mechanisms correspond exactly to the elements and mechanisms of Fig. 1 except that the supplemental motor switch has been omitted. However, the wiring connections between the various elements of Fig 2 are not the same as in the case of Fig. 1. The corresponding parts of Fig. 2 have been referenced to agree with the similar parts of Fig. 1.

With the parts in the position shown in Fig. 2 (it being noted that contact blades 13 and 15 are out of engagement with contacts 14 and 16 respectively and that stoker motor 10 and relay coil 18 are deenergized) as the timing disc 25 rotates lever 30 will be moved into engagement with contact 31. This establishes an energizing circuit for relay coil 18 as follows: secondary 42, wire 70, wire 71, lever 30, contact 31, wire 72, relay coil 18 and wire 73 to the other side of secondary 42. Energization of relay coil 18 moves switch arms 20 and 21 into engagement with contacts 22 and 23. Engagement of switch arm 20 with contact 22 energizes stoker motor 10 as follows: line 41, wire 74, contact 22, switch arm 20, wire 75, stoker motor 10 and wire 76 to line 40. Engagement of switch arm 21 with contact 23 has no effect at this time since contact blades 13 and 15 are both disengaged from their respective contacts 14 and 16. Therefore, relay coil 18 and stoker motor 10 will only remain energized for a relatively short time until crank pin 27 rotates sufficiently far to allow lever 30 to disengage contact 31. In this manner, a relatively small amount of heat is supplied to the room to offset the heat losses therefrom even when the room temperature is sufficiently high. This small amount of heat is obtained by supplying maximum heat for short periods with relatively long periods of minimum or no heat supply interposed therebetween.

If this small amount of heat is not sufficient to offset the heat losses, the room temperature will fall sufficiently to cause contact blade 13 to engage contact 14. Thereafter, the next time that relay coil 18 and stoker motor 10 are energized by engagement of lever 30 with contact 31 and switch arm 21 is moved into engagement with contact 23, then a holding circuit for relay coil 18 will be established as follows: secondary 42, wire 70, wire 77, bimetallic volute 12, contact blade 13, contact 14, wire 78, lever 28, contact 29, wire 79, switch arm 21, contact 23, wire 80, relay coil 18 and wire 73 to the other side of secondary 42. It will be noted that this holding circuit is independent of switch 30—31 so that stoker motor operation will continue after lever 30 disengages contacts 31 and until crank pin 27 rotates considerably further and moves lever 28 from engagement with contact 29. In this manner, when the room temperature is about at the desired point as indicated by engagement only of contact blade 13 with contact 14, an intermediate amount of heat is supplied to the room by intermittently operating the stoker for longer periods and at the same time shortening the rest periods of the stoker.

If the room temperature continues to fall so that contact blade 15 engages contact 16, then the next time relay coil 18 is energized to move switch arm 21 into engagement with contact 23, the relay coil 18 will be maintained energized continuously by the following circuit: secondary 42, wire 70, wire 77, bimetallic volute 12, contact blade 15, contact 16, wire 81, switch arm 21, contact 23, wire 80, relay coil 18 and wire 73 to the other side of secondary 42. Stoker motor 10 will likewise remain in continuous operation under these conditions.

The system of Fig. 2 therefore provides for a small supply of heat at all times irrespective of the temperature of the room. This system also provides for an intermediate supply of heat when the room temperature is approximately that desired. Both the small supply of heat and the intermediate supply of heat are obtained by intermittently furnishing maximum heat and minimum heat and by varying the lengths of time that maximum heat is supplied to the entire cycle of maximum heat supply and minimum or no heat supply.

Turning now to Fig. 3 of the drawings, a modification of the system of Fig. 1 is shown wherein the supplemental motor switch defined by 37—38—39 has been eliminated. Since Fig. 3 is a substantial duplicate of Fig. 1, similar reference characters have been used throughout except that in Fig. 3 a wire is shown as directly joining the switch arm 20 of the motor switch to the motor 10 and this wire is designated at 85. The circuit for motor 10 is therefore as follows: line wire 41, wire 55, contact 22, switch arm 20, wire 85, motor 10, and wire 58 to the line wire 40.

The operation of the system of Fig. 3 should be evident from the explanation of the operation of the system of Fig. 1. With the parts in the position shown, wherein neither of the contact blades 13 and 15 of the thermostat 11 is engaged with its respective cooperating contact 14 or 16, the relay coil 18 is deenergized so that the motor switch defined by the contact 22 and switch arm 20 is open. As a result, the motor 10 is deenergized. Now, if the temperature to which thermostat 11 responds should fall sufficiently to bring contact blade 13 into engagement with contact 14, the relay coil 18 will be energized as soon as the switch arm or lever 30 is raised into engagement with the cooperating contact 31. Energization of relay coil 18 causes closure of the holding switch defined by switch arm 21 and contact 23 whereby the relay coil 18 is maintained energized after the switch arm or lever 30 disengaged the contact 31. Energization of relay coil 18 also causes movement of switch arm 20 into engagement with contact 22 whereby to energize the motor 10 by the above described motor circuit. Relay coil 18 then remains energized until the pin 27 moves switch arm or lever 28 downwardly out of engagement with contact 29. When this occurs, the relay coil 18 is deenergized whereupon the aforementioned holding circuit is interrupted by reason of movement of switch arm 21 from engagement with contact 23. Likewise, the motor circuit is interrupted by movement of switch arm 20 from engagement with contact 22. In this manner, whenever the contact blade 13 of the thermostat 11 engages contact 14, the motor 10 is intermittently energized and deenergized and the armature 19 is intermittently moved from the position shown in Fig. 3 to the position in which the switch arms controlled thereby move to circuit-closed positions.

If the temperature to which the thermostat 11 responds should fall further so as to bring contact blade 15 into engagement with contact 16, the relay coil 18 will be energized continuously in the manner described in connection with Fig. 1 so that the motor 10 will be continuously energized, since the switch arm 20 will be maintained in continuous engagement with its associated contact 22 under these conditions.

The system of Fig. 3 therefore, by means of the omission of the supplement motor switch 37—38—39 of the system of Fig. 1, provides an arrangement wherein a condition or force-changing means is rendered inoperative to change a condition or force when the controlling condition or force is at one value, is operated intermittently at its maximum condition or force-changing capacity when the controlling condition or force is at another value, and is operated continuously at its maximum condition or force-changing capacity when the controlling condition or force is at a still different value.

It is to be expressly understood that while stokers and heating systems have been heretofore described, the inventions set forth herein are equally applicable to other phases of temperature control as well as the control of any desired condition or force. It will also be readily seen that many modifications could be made to the specific mechanisms herein described and I therefore intend to be limited only in the purview of the appended claims. Where the systems of my invention are used in connection with stokers, I contemplate that any of the usual mechanisms or methods of maintaining the fire alive and of preventing operation of the stoker if the fire should become extinguished should be used in connection therewith if necessary. In the same manner, I contemplate using the usual safety and auxiliary controls which are already well known in the art in conjunction with any and all of the inventions herein set forth. Specifically, for example, it will be recognized that the lever 30 and its contact 31 is but a preferred expedient to avoid operating the stoker motor 10 at that annoying frequency which would result if the motor 10 could be started by the thermostat contacts 13 and 14 at all times; other expedients to the same end are known however, and my invention is not limited to the expedient represented by 30 and 31.

I claim as my invention:

1. The combination of a stoker to provide heat for a space to be heated, a thermostat subject to the temperature of said space and having a plurality of pairs of contacts engageable at different temperatures, connections from one of said pairs of contacts to the stoker to put the stoker into continuous operation when the temperature at the thermostat is at a relatively low degree, means to operate the stoker intermittently, and connections from another of said pairs of contacts to said means to put the stoker into intermittent operation when the temperature at the thermostat is at a higher degree, said stoker being rendered inoperative when the temperature is at a still higher degree.

2. The combination of a stoker burning solid fuel to heat a space to be heated, a thermostat subject to the temperature of said space for controlling the operation of said stoker, said thermostat having two pairs of contacts brought into engagement at different temperatures, connections leading from one of said pairs of contacts through which the thermostat can require continuous operation of the stoker, intermittently operating means, and connections leading from the other of said pair of contacts and from said intermittently operating means through which the thermostat can require intermittent operation of the stoker, said stoker being inoperative when neither of said pairs of contacts is engaged.

3. The combination of a source of heat for a space to be heated, means actuatable when energized to change the rate of delivery of heat to said space by said source from a fixed value to a second value, a circuit to actuate said means, said circuit including an electromagnetic switch for opening and closing said circuit, a thermostat subject to the temperature of said space and including a pair of contacts to be brought into engagement with each other as the temperature passes to a predetermined degree, conductors forming a circuit through the operating winding of said electromagnetic switch and said pair of contacts, means for intermittently opening and closing said circuit, whereby the rate of heat delivery is intermittently changed from said first value to said second value and back again, and means including an additional pair of contacts at the thermostat, to be brought into engagement with each other as the temperature passes to another predetermined degree, providing another circuit to destroy the effect of said means for intermittently opening and closing the circuit through the first mentioned contacts of the thermostat, whereby the rate of heat delivery is changed to said second value and maintained therein.

4. The combination of a source of heat for a space to be heated, means actuatable to change the rate of delivery of heat to said space by said source, a circuit to actuate said means, said circuit including an electromagnetic switch for opening and closing said circuit, a thermostat subject to the temperature of said space and including a pair of contacts to be brought into engagement with each other as the temperature passes to a predetermined degree, a second pair of contacts, means for intermittently opening and closing said second pair of contacts, conductors forming a circuit through the operating winding of said electromagnetic switch and said two pairs of contacts in series, means providing a holding circuit for said electromagnetic switch, including the first mentioned pair of contacts, established when said switch has been operated by said winding, and means for intermittently opening said holding circuit.

5. The combination of a source of heat for a space to be heated, means actuatable to change the rate of delivery of heat to said space by said source, a circuit to actuate said means, said circuit including an electromagnetic switch for opening and closing said circuit, a thermostat subject to the temperature of said space and including a pair of contacts to be brought into engagement with each other as the temperature passes to a predetermined degree, a second pair of contacts, means for intermittently opening and closing said second pair of contacts, conductors forming a circuit through the operating winding of said electromagnetic switch and said two pairs of contacts in series, means providing a holding circuit for said electromagnetic switch, including the first mentioned pair of contacts, established when said switch has been operated by said winding, means for intermittently opening said holding circuit and means including an additional pair of contacts at the thermostat, to be brought into engagement with each other as the temperature passes to another predetermined degree, providing another holding circuit to destroy the effect of said means for intermittently opening the first mentioned holding circuit.

6. In combination, a stoker for heating a space, a space temperature responsive thermostat, a timer, and means associated with said stoker, thermostat and timer for operating the stoker at maximum capacity for predetermined intervals of relatively short duration when the space temperature is above the desired value and for operating said stoker at maximum capacity for predetermined intervals of longer duration when said space temperature is below said value.

7. In combination, an electrically operable stoker which operates at maximum capacity when energized and is inoperative when deenergized, switching mechanism responsive to the condition to be controlled, a timer, and means associated with said stoker, switching mechanism and timer for energizing the stoker for intervals of relatively short duration when the value of said condition is above that desired, for energizing the stoker for intervals of longer duration when the value of said condition falls to substantially that desired and for energizing said stoker continuously when the value of said condition falls still lower.

8. In combination, means for changing a condition or force, an electrically energizable device in control thereof, a holding switch moved to closed position by said device when energized, a normally open switch, a normally closed switch, means controlled by a condition or force other than the condition or force to be controlled for momentarily opening said normally closed switch and for momentarily closing said normally open switch while the normally closed switch is closed, a condition or force responsive switch closed at one value thereof, an energizing circuit for said device including said condition or force responsive switch and said normally open and closed switches in series, and a holding circuit for said device including said condition or force responsive switch, said holding switch and said normally closed switch in series, whereby when said condition or force responsive switch is closed said device is energized upon closing of said normally open switch and is deenergized upon opening of said normally closed switch.

9. In combination, means for changing a condition or force, an electrically energizable device in control thereof, a holding switch moved to closed position by said device when energized, a normally open switch, a normally closed switch, means controlled by a condition or force other than the condition or force to be controlled for momentarily opening said normally closed switch and for momentarily closing said normally open switch while the normally closed switch is closed, a condition or force responsive switch closed at one value thereof, an energizing circuit for said device including said condition or force responsive switch and said normally open and closed switches in series, a holding circuit for said device including said condition or force responsive switch, said holding switch and said normally closed switch in series, whereby when said condition or force responsive switch is closed said device is energized upon closing of said normally open switch and is deenergized upon opening of said normally closed switch, a second condition or force responsive switch which closes at another value of the condition or force, and a second circuit for said device controlled by said last-named switch and independent of said normally open and closed switches and said holding switch.

10. In combination, temperature changing means, an electrically energizable device in control thereof, a holding switch moved to closed position by said device when energized, a normally open switch, a normally closed switch, means controlled by a condition or force other than the temperature to be controlled for opening said normally closed switch and for closing said normally open switch while the normally closed switch is closed, a temperature responsive switch which closes at a predetermined temperature, an energizing circuit for said device including said temperature responsive switch and said normally open and closed switches in series, and a holding circuit for said device including said temperature responsive switch, said holding switch and said normally closed switch in series, whereby when said temperature responsive switch is closed said device is energized upon closing of said normally open switch and is deenergized upon opening of said normally closed switch.

11. In combination, a heater for heating a space, an electrically energizable device in control thereof, a holding switch moved to closed position by said device when energized, a normally open switch, a normally closed switch, means controlled by a condition or force other than the space temperature for opening said normally closed switch and for closing said normally open switch while the normally closed switch is closed, a space temperature responsive switch closed at one value thereof, an energizing circuit for said device including said space temperature responsive switch and said normally open and closed switches in series, and a holding circuit for said device including said space temperature responsive switch, said holding switch and said normally closed switch in series, whereby when said space temperature responsive switch is closed said device is energized upon closing of said normally open switch and is deenergized upon opening of said normally closed switch.

12. In combination, means for changing a condition or force, an electrically energizable device in control thereof, a holding switch moved to closed position by said device when energized, a normally open switch, a normally closed switch, timing means for repeatedly alternately closing said normally open switch and opening said normally closed switch, a condition or force responsive switch which closes at a predetermined value thereof, an energizing circuit for said device controlled by said force or condition responsive switch and said normally open and closed switches in series whereby said device is energized when the condition or force responsive switch and the normally open switch are both closed at the same time, and a holding circuit for said device controlled by said condition or force responsive switch, holding switch and normally closed switch in series whereby said device remains energized after re-opening of said normally open switch and until said condition or force responsive switch or said normally closed switch opens.

13. In combination, temperature changing means, an electrically energizable device in control thereof, a holding switch moved to closed position by said device when energized, a normally open switch, a normally closed switch, timing means for repeatedly alternately closing said normally open switch and opening said normally closed switch, a temperature responsive switch which closes at a predetermined temperature value, an energizing circuit for said device controlled by said temperature responsive switch and said normally open and closed switches in series whereby said device is energized when the temperature responsive switch and the normally open switch are both closed at the same time, and a holding circuit for said device controlled by said temperature responsive switch, holding switch and normally closed switch in series whereby said device remains energized after re-opening of said normally open switch and until said temperature responsive switch or said normally closed switch opens.

14. In combination, a heater for heating a space an electrically energizable device in control thereof, a holding switch moved to closed position by said device when energized, a normally open switch, a normally closed switch, timing means for repeatedly alternately closing said normally open switch and opening said normally closed switch, a condition responsive switch which closes at a predetermined value, an energizing circuit for said device controlled by said condition responsive switch and said normally open and closed switches in series whereby said device is energized when the condition responsive switch and the normally open switch are both closed at the same time, and a holding circuit for said device controlled by said condition responsive switch, holding switch and normally closed switch in series whereby said device remains energized after re-opening of said normally open switch and until said condition responsive switch or said normally closed switch opens.

15. In combination, an electrically energizable device, a holding switch moved to closed position by said device when energized, a normally open switch, a normally closed switch, timing means for repeatedly alternately closing said normally open switch and opening said normally closed switch, a condition or force responsive switch which closes at a predetermined value thereof, an energizing circuit for said device controlled by said force or condition responsive switch and said normally open and closed switches in series whereby said device is energized when the condition or force responsive switch and the normally open switch are both closed at the same time, a holding circuit for said device controlled by said condition or force responsive switch, holding switch and normally closed switch in series whereby said device remains energized after re-opening of the normally opened switch and until said condition or force responsive switch or said normally closed switch opens, a second condition or force responsive switch closed at another value thereof, and a second energizing circuit for said device controlled by said second condition or force responsive switch and independent of said normally open and closed switches.

16. In a temperature changing system, in combination, a temperature responsive switching mechanism operative to sequentially close first and second switches on temperature fall and to open the second and then the first on temperature rise, a relay coil, a load switch and a holding switch closed thereby when energized, a first timer operated switch which is normally open, a second timer operated switch which is normally closed, a timer which periodically momentarily closes said first timer switch and momentarily opens said second timer operated switch, an electrically controlled temperature changing device which is energized by closure of said load switch, a circuit to energize said relay coil which circuit includes said normally open timer switch, a circuit to maintain energization of said relay coil which includes the first temperature operated switch, the normally closed timer operated switch and the holding switch in series, and a third circuit for said relay coil which circuit includes said second temperature operated switch.

17. A temperature control system of the class described, comprising, in combination, an electrically operated heat producing device which produces a maximum amount of heat when energized, a switch controlled by the temperature of a space heated thereby and closed when the space temperature falls below a given value, means to continuously energize said heat producing device when said switch is closed, a timing device, and switching means operated thereby at least every thirty minutes for intermittently energizing said heat producing device and maintaining said device in operation for a period sufficient to supply a substantial amount of heat to said space when said switch is open.

18. A temperature control system of the class described, comprising, in combination, an electrically operated heat producing device which produces a maximum amount of heat when energized, a switch controlled by the temperature of a space heated thereby and closed when the space temperature falls below a given value, means to continuously energize said heat producing device when said switch is closed, a timing device, and switching means operated thereby for intermittently energizing said heat producing device when said switch is open and at a frequency of at least once every thirty minutes, the "on" periods being substantially equal to the "off" periods.

19. A temperature control system of the class described, comprising, in combination, an electrically operated heat producing device which produces a maximum amount of heat when energized, a switch controlled by the temperature of a space heated thereby and closed when the space temperature falls below a given value, means to continuously energize said heat producing device when said switch is closed, a timing device including a constantly operating member, switching means operated thereby at least once every thirty minutes for intermittently energizing said heat producing device when said switch is open, and another switch controlled by the temperature of the space heated, which when open, prevents energization of said heat producing device by said timing device.

20. A temperature control system of the class described, comprising, in combination, an electrically operated heat producing device which produces a maximum amount of heat when energized, a switch controlled by the temperature of a space heated thereby which is closed when the space temperature falls below a given value to continuously energize said heat producing device, a timing device, switching means operated thereby at least once every thirty minutes for intermittently energizing said heat producing device substantially half of the time when said switch is open, and another switch controlled by the temperature of the space heated, which when open, prevents energization of said heat producing device by said timing device.

21. A temperature control system of the class described, comprising, in combination, an electrically operated heat producing device which produces a maximum amount of heat when energized, a switch controlled by the temperature of a space heated thereby and closed when the space temperature falls below a given value, means to continuously energize said heat producing device when said switch is closed, a timing device, and switching means operated thereby at least every fifteen minutes for intermittently energizing said heat producing device and maintaining said device in operation for a period sufficient to supply a substantial amount of heat to said space when said switch is open.

22. A temperature control system of the class described, comprising, in combination, an electrically operated heat producing device which produces a maximum amount of heat when energized, a switch controlled by the temperature of a space heated thereby and closed when the space temperature falls below a given value, means to continuously energize said heat producing device when said switch is closed, a timing device, switching means operated thereby for intermittently energizing said heat producing device at least once every fifteen minutes while said switch is open, the "on" periods being substantially equal to the "off" periods, and a switch also controlled by the temperature of the space heated which when open, prevents energization of said heat producing device by said timing device.

23. A temperature control system of the class described, comprising, in combination, an electrically operated heat producing device which produces a maximum amount of heat when energized, a switch controlled by the temperature of a space heated thereby and closed when the space temperature falls below a given value, means to continuously energize said heat producing device when said switch is closed, a timing device and switching means operated thereby for intermittently energizing said heat producing device substantially every ten minutes when said switch is open, and maintaining said device in operation for a period sufficient to supply a substantial amount of heat to said space.

24. In a temperature control system, in combination, an electrically operated device for changing the temperature of a space when energized, a space temperature responsive device, a switch controlled thereby and moved to closed position when said space temperature deviates from the desired value in one direction, said switch remaining open whenever the space temperature deviates from the desired value in the opposite direction, a timing device, switching mechanism operated thereby, and circuit connections interconnecting said switch and switching mechanism in a manner to periodically energize said temperature changing device for relatively short periods in respect to the total elapsed time whenever said switch is open thereby indicating that no temperature change effect is necessary, and for energizing said temperature changing device for relatively longer periods in respect to the total elapsed time whenever said switch is closed thereby indicating that a temperature changing effect is needed.

25. In a control system for a solid fuel feeding means for heating a space, in combination, an electrical device which when energized operates said fuel feeding means to cause heating of said space, a spaced temperature responsive means, a switch operated thereby which is closed whenever the space temperature is below the desired value and which is open whenever the space temperature is higher than desired, a timing device, switching means operated thereby, and means including circuit connections interconnecting said electrical device, switch and switching means for energizing said electrical device for relatively short periods of time in respect to the total elapsed time when said switch is open and at such a frequency as to keep the fire alive and for energizing said electrical device for relatively longer periods of time in respect to the total elapsed time when said switch is closed to cause feeding of fuel at a rate higher than that necessary to keep the fire alive.

WILLIAM M. SCHWEICKART.